Figure 1:
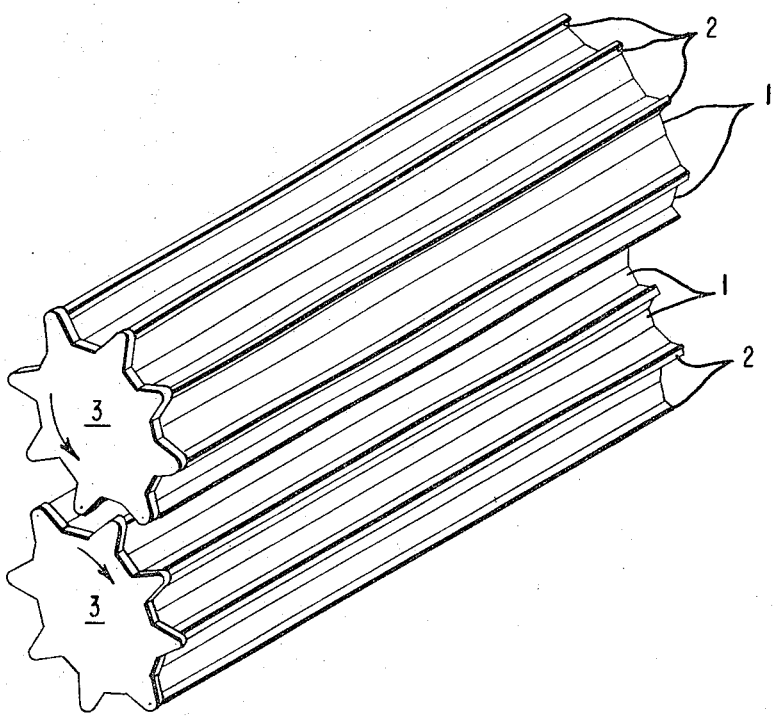
Figure 2:
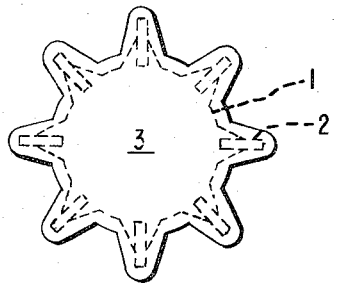

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 10

T883,010

PROTECTIVE CAP FOR OUTBOARD EDGES OF BREAKER BAR ON BREAKER ROLLS

Charles A. Amos, Waynesboro, Va., assignor to E. I. du Pont de Nemours and Company, Wilmington, Del., a corporation of Delaware

Filed Apr. 8, 1970, Ser. No. 26,502
Int. Cl. D01g *1/08*
U.S. Cl. 19—.37
1 Sheet Drawing. 4 Pages Specification

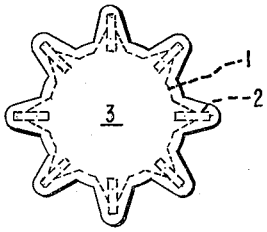

A protective cap is provided as an improvement to an apparatus for stretch-breaking synthetic tows. This apparatus includes a breaker means which comprises a pair of cantilevered shafts, breaker rolls formed at the outboard ends of said shafts and a plurality of substantially flat breaker bars radially aligned on said breaker rolls. The breaker rolls are mounted in such a manner that when rotated in opposite directions, the breaker bars of one roll interdigitate to a controllable depth with the breaker bars of the other roll. The protective cap, identified by the numeral 3 in the drawing, fits snugly over at least about ¼ inch of the outboard edges of the breaker bars of one of said breaker rolls. The cap protects the ceramic breaker bars against chipping when taut multifilament tows are inserted therebetween. Since only those circumferential forces which are applied to the outer ¼ inch of the breaker bars is likely to lead to chipping and breaking, it is preferred that the protective cap fit snugly over the outboard ¼ inch of the edges of the breaker bars. Alternatively, the protective cap can be attached to the outboard end of one of said breaker rolls. It is preferred that the protective cap be formed from a thin sheet metal.

Feb. 2, 1971 C. A. AMOS T883,010

PROTECTIVE CAP FOR OUTBOARD EDGES OF BREAKER BAR ON BREAKER ROLLS

Filed April 8, 1970

INVENTOR
CHARLES A. AMOS

BY Eugene Berman

ATTORNEY